UNITED STATES PATENT OFFICE.

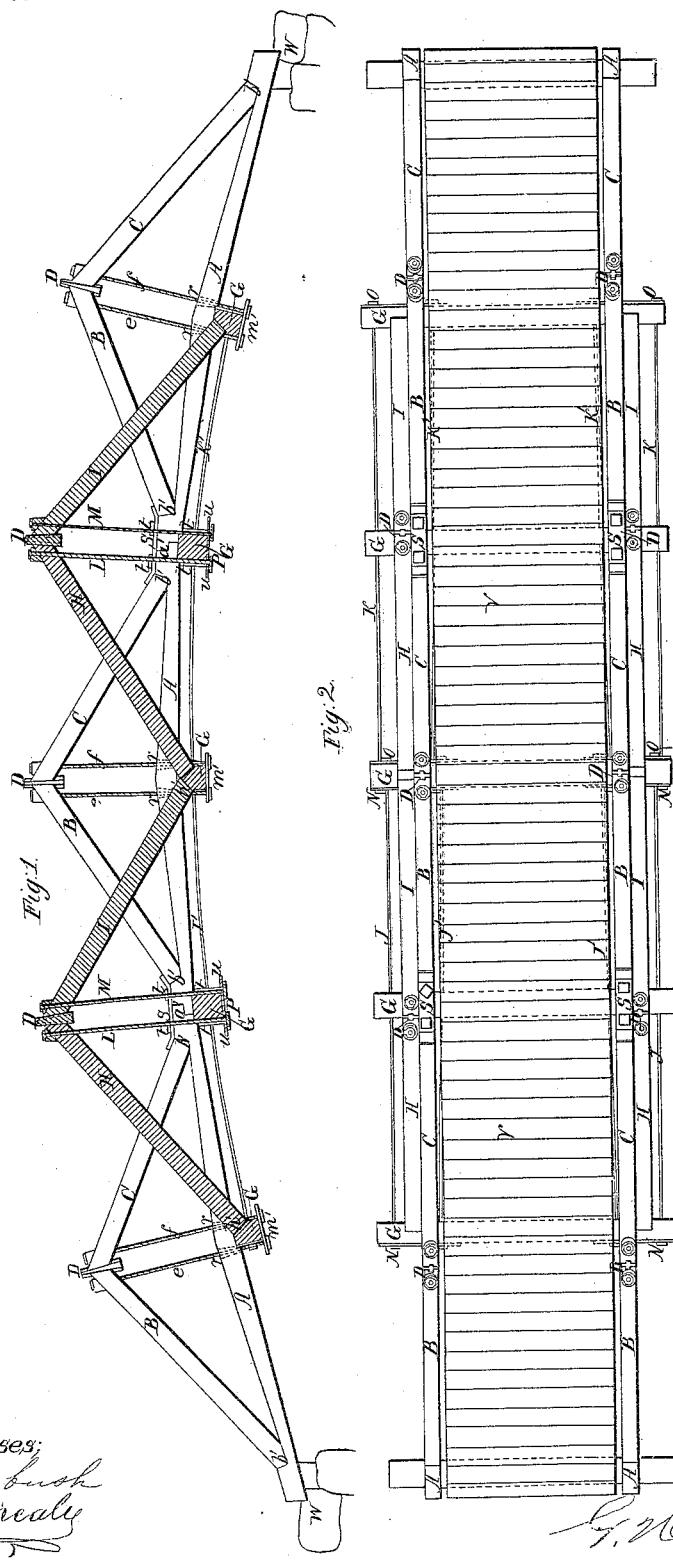

GEORGE H. BRUCE, OF LANCASTER, NEW YORK.

IMPROVEMENT IN BRIDGES.

Specification forming part of Letters Patent No. 34,102, dated January 7, 1862.

*To all whom it may concern:*

Be it known that I, GEORGE H. BRUCE, of Lancaster, in the county of Erie and State of New York, have invented a new and Improved Bridge; and I do hereby declare that the following is a full and exact description thereof, reference being had to the accompanying drawings, in which—

Figure I is an elevation showing the combination of two bridge-frames, the truss-frame being represented in section. Fig. II is a plan.

The nature of my invention relates, first, to the combination of two bridge-frames in a manner to combine and unite both frames in one bridge, one of which frames I designate as the "arch-frame" and the other as the "truss-frame," each being a distinct structure and self-supporting when considered separately from the other; second, in the combination of a tongued wedge with each pair of principal rafters at their apex for the purpose of filling the space left between the ends of said rafters in a manner to compensate for any shrinkage of the timbers or any sagging of the bridge, and also to prevent any side slip to the rafters.

Letters of like name and kind refer to like parts in each of the figures.

The arch-frame is composed of the several arch-beams A, suitably framed together at their contiguous ends, as shown at $a'$, and truss-braces or principal rafters B and C, which rafters are placed in pairs—one pair for each beam—connected at the top by the wedge D and stepped onto the beams at the foot, as shown at $b'$, and the suspension-rods $e$ and $f$.

The truss-frame is composed of the swing-beams G, truss-braces or principal rafters H and I, arranged in pairs and stepped onto the swing-beams at the foot, as shown at $h'$, tie-rods J and K and J' and K', and suspension-rods L and M. Each of the tie-rods J K is of sufficient length to pass through three of the swing-beams in a manner to tie together the two beams upon which each pair of the rafters of the truss-frame is stepped, as will be understood, by the large head N upon one end of the rod and the screw-nut O upon the other end. These swing-beams are so placed when the two frames are put together that one of them will be directly under the apex of each pair of the principal rafters of the arch-frame, so that the suspension-rods $e$ and $f$, which drop down from the principal rafters of the arch-frame, will form a stirrup under the swing-beam, as shown at $m'$.

The suspension-rods L M of the truss-frame drop down from the top of the principal rafters and form a stirrup under the central swing-beam, as shown at P. A long mortise is made through the arch-beams through which these suspension-rods pass, as shown at $r$, which mortises are sufficiently large to allow for any variation or spring, contraction, or expansion occasioned by change of temperature or by heavy loads.

A strengthening-piece S, made of cast or wrought iron, is placed across the contiguous ends of the arch-beam and extends onto the foot of the principal rafters, as shown. Two bolts $t\ t$ pass through this piece and through the arch-beams and form a stirrup under the central swing-beams, as shown at $n$. The stirrups formed by these bolts and the suspension-rods $e\ f$ bind the two frames together.

D represents a wedge having a tongue upon either side, which tongue passes into a corresponding groove made in the contiguous end of the rafter. The rafters are made a little short, in order to admit the wedge when the rafters are put together. The wedge must be driven in tight when the bridge is built, and it is made of sufficient length and thickness to be driven in and kept tight in case of any subsequent shrinkage of the timbers or any sagging of the bridge. By this means (in connection with the suspension and tie rods) the timbers of the bridge may at all times be kept tightly together, so as to produce an equilibrium of strain upon all parts of the bridge, and so that the bridge shall not at any time become weakened by occasion of loose or unfitting joints. This wedge will also, by reason of its tongues fitting into the grooves made in the end of the rafters, prevent any side slip of the rafters.

V represents the flooring or roadway.

The ends of the arch-frame rest on the abutments W and may and should lap onto the abutments sufficiently far to allow the ends of the truss-frame to also rest on the abutments, or at least to come very near to the abutments.

The advantage which this bridge has over other bridges of ordinary construction is its extraordinary strength, combined with its extraordinary cheapness of construction. A bridge upon this plan may be built one hundred and twenty feet in length (or more) at an expense of four dollars per lineal foot, and will resist all ordinary strains to which such bridges are subjected. In case of the decay or breaking of either one of the timbers of the frame, its place may be supplied with a new timber without preventing or retarding the use of the bridge during the repairing. The truss-frame may be added to and combined with any ordinary bridge already built, so as to combine the strength of the two according to the principle of this invention.

What I claim as my invention, and desire to secure by Letters Patent, is—

1. The combination of a truss-bridge frame with an arch-bridge frame, so as to combine the strength of the two frames in one bridge, substantially as set forth.

2. The tongued wedge D, in combination with the contiguous grooved ends of each pair of principal rafters, in the manner and for the purpose substantially as described.

G. H. BRUCE.

Witnesses:
E. B. FORBUSH,
B. H. MEALY.